US009804874B2

(12) United States Patent
Fahrig (10) Patent No.: US 9,804,874 B2
(45) Date of Patent: Oct. 31, 2017

(54) CONSOLIDATION OF IDLE VIRTUAL MACHINES ON IDLE LOGICAL PROCESSORS

(75) Inventor: Thomas Fahrig, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 1082 days.

(21) Appl. No.: 13/090,633

(22) Filed: Apr. 20, 2011

(65) Prior Publication Data

US 2012/0272235 A1    Oct. 25, 2012

(51) Int. Cl.
*G06F 9/455*    (2006.01)
*G06F 9/50*    (2006.01)

(52) U.S. Cl.
CPC ........ *G06F 9/45558* (2013.01); *G06F 9/5077* (2013.01); *G06F 9/5094* (2013.01); *G06F 2009/45591* (2013.01); *Y02B 60/142* (2013.01); *Y02B 60/167* (2013.01)

(58) Field of Classification Search
CPC ........ G06F 2009/4559; G06F 9/45558; G06F 9/5077; G06F 9/5094; Y02B 60/142; Y02B 60/167
See application file for complete search history.

(56) References Cited

U.S. PATENT DOCUMENTS

| | | | | |
|---|---|---|---|---|
| 7,356,817 B1 * | 4/2008 | Cota-Robles | ....... | G06F 9/45537 710/262 |
| 7,594,128 B2 | 9/2009 | Bacchus et al. | | |
| 7,802,073 B1 * | 9/2010 | Cheng et al. | ................... | 712/10 |
| 7,861,068 B2 | 12/2010 | Gorbatov et al. | | |
| 7,861,102 B1 * | 12/2010 | Ranganathan | ........ | G06F 1/3206 713/300 |
| 8,607,082 B2 * | 12/2013 | Kamay et al. | ................ | 713/320 |
| 2008/0168457 A1 * | 7/2008 | Accapadi et al. | ............ | 718/104 |
| 2009/0249094 A1 | 10/2009 | Marshall et al. | | |
| 2010/0218183 A1 * | 8/2010 | Wang et al. | ....................... | 718/1 |
| 2011/0010709 A1 * | 1/2011 | Anand | ................ | G06F 9/45533 718/1 |

(Continued)

OTHER PUBLICATIONS

"Introducing the 45nm Next-Generation Intel® Core™ Microarchitecture", White Paper, Intel Corporation, Copyright © 2007, 1-8.

(Continued)

*Primary Examiner* — Wissam Rashid
*Assistant Examiner* — Jorge A Chu Joy-Davila
(74) *Attorney, Agent, or Firm* — Baker & Hostetler LLP (57) ABSTRACT

Idle virtual machine partitions in a virtualized computing environment are consolidated onto one or more idle logical processors. A hypervisor monitors the individual utilization of multiple virtual machine partitions in a computing environment and determines which virtual machine partitions are idle. The hypervisor also monitors the individual utilization of multiple logical processors in the computing environment and determines which logical processors are idle. The hypervisor schedules all of the idle virtual machine partitions on one or more of the idle logical processors. This can improve the performance for work-generating partitions and ensure compliance with service level agreements. At the same time, it can provide efficient power management in that is consolidates idle virtual machines onto a smaller subset of logical processors.

19 Claims, 10 Drawing Sheets

(56) References Cited

U.S. PATENT DOCUMENTS

2011/0099267 A1* 4/2011 Suri et al. ............... 709/224
2011/0320840 A1* 12/2011 Nayar et al. ............. 713/323
2012/0096293 A1* 4/2012 Floyd et al. ............. 713/323

OTHER PUBLICATIONS

"Leading Virtualization 2.0", White Paper, Intel® Virtualization Technology (Intel® VT), Intel Corporation, Copyright © 2008, 2011, 1-5.
Amur et al., "IdlePower: Application-Aware Management of Processor Idle States", Center for Experimental Research in Computer Systems, 2008, 8 pages.
Beloglazov et al., "Adaptive Threshold-Based Approach for Energy-Efficient Consolidation of Virtual Machines in Cloud Data Centers", MGC '2010, Nov. 29-Dec. 3, 2010, 6 pages.
Dasgupta et al., "Workload Management for Power Efficiency in Virtualized Data-Centers", White Paper, Copyright © 2009, 1-17.
Stoess et al., "Energy Management for Hypervisor-Based Virtual Machines", Proceedings of the USENIX Annual Technical Conference, Santa Clara, CA, Jun. 17-22, 2007, 1-23.
Verma et al., "Server Workload Analysis for Power Minimization using Consolidation", IBM India Research Lab, Proceedings of the 2009 conference on USENIX Annual technical conference, Aug. 5, 2009, 14 pages.

* cited by examiner

FIGURE 9D

CONSOLIDATION OF IDLE VIRTUAL MACHINES ON IDLE LOGICAL PROCESSORS

BACKGROUND

The subject matter of this application relates to the scheduling of virtual machine partitions on logical processors in a computing system. In a virtualization environment a layer of virtualizing software (typically called a hypervisor or virtual machine monitor) is installed on a computer system and controls how virtual machine partitions interact with multiple logical processors (also referred to as physical processors or cores) in the computing system. A virtual machines has one or more virtual processors. Each of those virtual processors are scheduled to run on the available logical processors. A logical processor is the physical hardware thread executing instructions.

The performance of each logical processor and the overall performance of the computing system are affect by the way in which the virtual machines are scheduled on the logical processors. For example, the scheduling of virtual machines on the logical processors can affect the performance of the virtual machine partitions, the performance of the logical processors, the power consumption of the individual logical processors, the power consumption of the computing system as a whole, and other performances of the computing system.

SUMMARY

The present invention relates to the consolidation of idle virtual machine partitions on idle logical processors. A hypervisor monitors the individual utilization of each virtual machine partition in a computing environment and determines which of the virtual machine partitions are idle. The hypervisor also monitors the individual utilization of each logical processor in the computing environment and determines which logical processors are idle. The hypervisor schedules each idle virtual machine partition on one or more of the idle logical processors.

In one embodiment of the present invention, the hypervisor determines a subset of idle virtual machine partitions by comparing the utilization of each of the virtual machine partitions to an idle partition threshold. In another embodiment, the utilization of each logical processor is the utilization of logical processors based on non-idle virtual machine partitions. In yet another embodiment of the present invention, the hypervisor determines a subset of idle logical processors by comparing the utilization of each logical processor to an idle logical processor threshold. In still another embodiment of the invention, all of the virtual machine partitions in the subset of idle partitions are scheduled on one logical processor.

DETAILED DESCRIPTION OF ILLUSTRATIVE EMBODIMENTS

Figure 1:
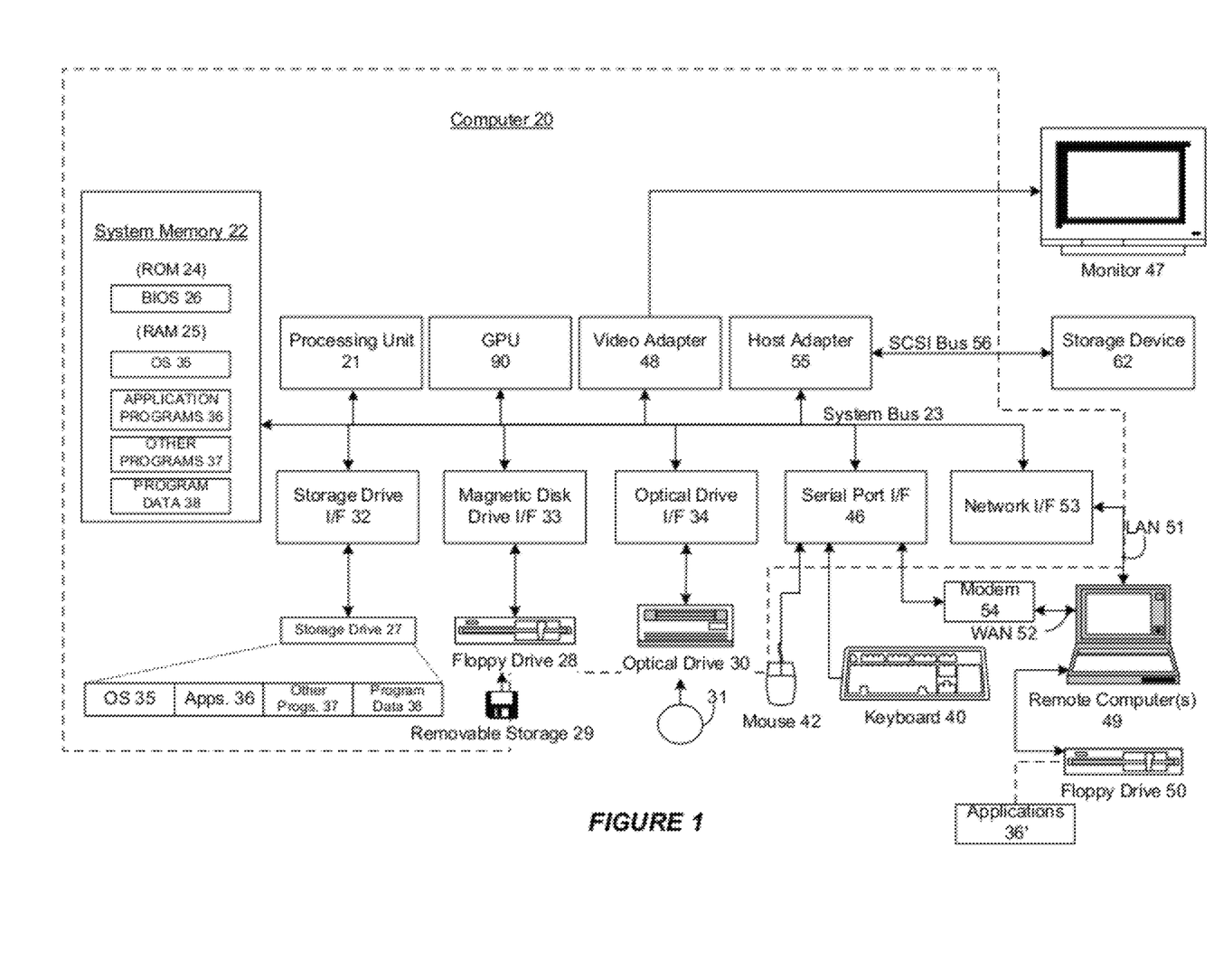
FIG. 1 depicts a block diagram of a computer system.

The disclosed subject matter may use one or more computer systems. FIG. 1 and the following discussion are intended to provide a brief general description of a suitable computing environment in which the disclosed subject matter may be implemented.

FIG. 1 depicts an example general purpose computing system. The general purpose computing system may include a conventional computer 20 or the like, including processing unit 21. Processing unit 21 may comprise one or more processors, each of which may have one or more processing cores. A multi-core processor, as processors that have more than one processing core are frequently called, comprises multiple processors contained within a single chip package.

Computer 20 may also comprise graphics processing unit (GPU) 90. GPU 90 is a specialized microprocessor optimized to manipulate computer graphics. Processing unit 21 may offload work to GPU 90. GPU 90 may have its own graphics memory, and/or may have access to a portion of system memory 22. As with processing unit 21, GPU 90 may comprise one or more processing units, each having one or more cores.

Computer 20 may also comprise a system memory 22, and a system bus 23 that communicative couples various system components including the system memory 22 to the processing unit 21 when the system is in an operational state. The system memory 22 can include read only memory (ROM) 24 and random access memory (RAM) 25. A basic input/output system 26 (BIOS), containing the basic routines that help to transfer information between elements within the computer 20, such as during start up, is stored in ROM 24. The system bus 23 may be any of several types of bus structures including a memory bus or memory controller, a peripheral bus, or a local bus, which implements any of a variety of bus architectures. Coupled to system bus 23 may be a direct memory access (DMA) controller 80 that is configured to read from and/or write to memory independently of processing unit 21. Additionally, devices connected to system bus 23, such as storage drive I/F 32 or magnetic disk drive I/F 33 may be configured to also read from and/or write to memory independently of processing unit 21, without the use of DMA controller 80.

The computer 20 may further include a storage drive 27 for reading from and writing to a hard disk (not shown) or a solid-state disk (SSD) (not shown), a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are shown as connected to the system bus 23 by a hard disk drive interface 32, a magnetic disk drive interface 33, and an optical drive interface 34, respectively. The drives and their associated computer-readable storage media provide non-volatile storage of computer readable instructions, data structures, program modules and other data for the computer 20. Although the example environment described herein employs a hard disk, a removable magnetic disk 29 and a removable optical disk 31, it should be appreciated by those skilled in the art that other types of computer readable media which can store data that is accessible by a computer, such as flash memory cards, digital video discs or digital versatile discs (DVDs), random access memories (RAMs), read only memories (ROMs) and the like may also be used in the example operating environment. Generally, such computer readable storage media can be used in some embodiments to store processor executable instructions embodying aspects of the present disclosure. Computer 20 may also comprise a host adapter 55 that connects to a storage device 62 via a small computer system interface (SCSI) bus 56.

A number of program modules comprising computer-readable instructions may be stored on computer-readable media such as the hard disk, magnetic disk 29, optical disk 31, ROM 24 or RAM 25, including an operating system 35, one or more application programs 36, other program modules 37, and program data 38. Upon execution by the processing unit, the computer-readable instructions cause actions described in more detail below to be carried out or cause the various program modules to be instantiated. A user may enter commands and information into the computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, computers typically include other peripheral output devices (not shown), such as speakers and printers.

The computer 20 may operate in a networked environment using logical connections to one or more remote computers, such as a remote computer 49. The remote computer 49 may be another computer, a server, a router, a network PC, a peer device or other common network node, and typically can include many or all of the elements described above relative to the computer 20, although only a memory storage device 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the INTERNET. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

In an embodiment where computer 20 is configured to operate in a networked environment, OS 35 is stored remotely on a network, and computer 20 may netboot this remotely-stored OS rather than booting from a locally-stored OS. In an embodiment, computer 20 comprises a thin client where OS 35 is less than a full OS, but rather a kernel that is configured to handle networking and display output, such as on monitor 47.

Figure 2:
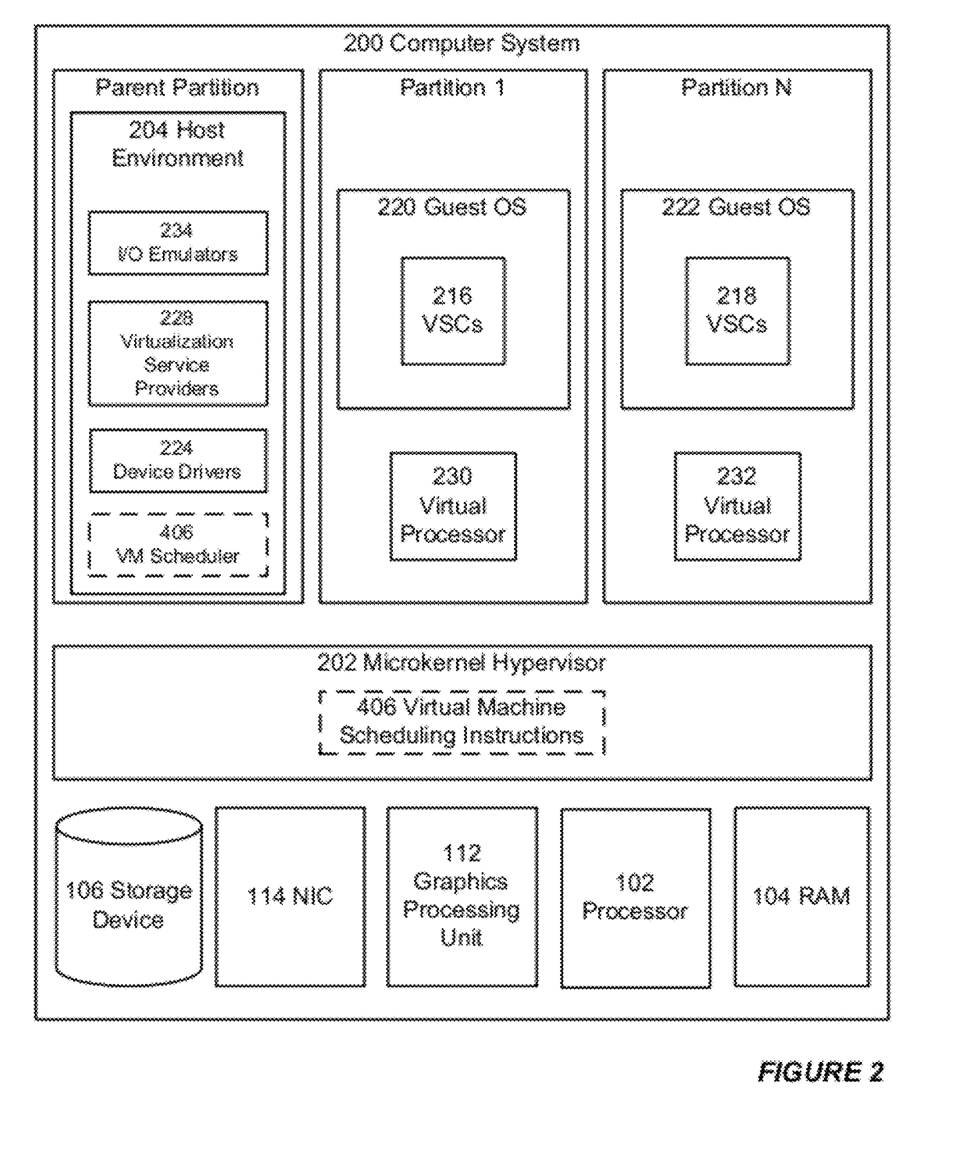
FIG. 2 depicts a block diagram of an exemplary architecture for a virtualizing software program.

Turning to FIG. 2, illustrated is an exemplary virtualization platform that can be used to generate virtual machines.

In this embodiment, microkernel hypervisor 202 can be configured to control and arbitrate access to the hardware of computer system 200. Microkernel hypervisor 202 can generate execution environments called partitions such as child partition 1 through child partition N (where N is an integer greater than 1). Here, a child partition is the basic unit of isolation supported by microkernel hypervisor 202. Microkernel hypervisor 202 can isolate processes in one partition from accessing another partition's resources. In particular, microkernel hypervisor 202 can isolate kernel mode code of a guest operating system from accessing another partition's resources as well as user mode processes. Each child partition can be mapped to a set of hardware resources, e.g., memory, devices, processor cycles, etc., that is under control of the microkernel hypervisor 202. In embodiments, microkernel hypervisor 202 can be a standalone software product, a part of an operating system, embedded within firmware of the motherboard, specialized integrated circuits, or a combination thereof.

Microkernel hypervisor 202 can enforce partitioning by restricting a guest operating system's view of the memory in a physical computer system. When microkernel hypervisor 202 instantiates a virtual machine, it can allocate pages, e.g., fixed length blocks of memory with starting and ending addresses, of system physical memory (SPM) to the virtual machine as guest physical memory (GPM). Here, the guest's restricted view of system memory is controlled by microkernel hypervisor 202. The term guest physical memory is a shorthand way of describing a page of memory from the viewpoint of a virtual machine and the term system physical memory is shorthand way of describing a page of memory from the viewpoint of the physical system. Thus, a page of memory allocated to a virtual machine will have a guest physical address (the address used by the virtual machine) and a system physical address (the actual address of the page).

A guest operating system operating in a virtual partition, operates much the same way that an operating system operates on a physical machine. A guest operating system may virtualize guest physical memory through the same virtual memory management techniques that an operating system applies to physical memory. Virtual memory management is a technique that allows an operating system to over commit memory and to give an application sole access to a logically contiguous working memory. And just as an operating system uses page tables in a physical environment, in a virtualized environment, a guest operating system can use one or more page tables, called guest page tables in this context, to translate virtual addresses, known as virtual guest addresses into guest physical addresses. In this example, a memory address may have a guest virtual address, a guest physical address, and a system physical address.

In the depicted example, parent partition component, which can also be also thought of as similar to domain 0 of Xen's open source hypervisor can include a host environment 204. Host environment 204 can be an operating system (or a set of configuration utilities) and host environment 204 can be configured to provide resources to guest operating systems executing in the child partitions 1-N by using virtualization service providers 228 (VSPs). VSPs 228, which are typically referred to as back-end drivers in the open source community, can be used to multiplex the interfaces to the hardware resources by way of virtualization service clients (VSCs) (typically referred to as front-end drivers in the open source community or paravirtualized devices). As shown by the figures, virtualization service clients execute within the context of guest operating systems. However, these drivers are different than the rest of the drivers in the guest in they communicate with host environment 204 via VSPs instead of communicating with hardware or emulated hardware. In an exemplary embodiment the path used by virtualization service providers 228 to communicate with virtualization service clients 216 and 218 can be thought of as the enlightened IO path.

As shown by the figure, emulators 234, e.g., virtualized IDE devices, virtualized video adaptors, virtualized NICs, etc., can be configured to run within host environment 204 and are attached to emulated hardware resources, e.g., IO ports, guest physical address ranges, virtual VRAM, emulated ROM ranges, etc. available to guest operating systems 220 and 222. For example, when a guest OS touches a guest virtual address mapped to a guest physical address where a register of a device would be for a memory mapped device, microkernel hypervisor 202 can intercept the request and pass the values the guest attempted to write to an associated emulator. Here, the emulated hardware resources in this example can be thought of as where a virtual device is located in guest physical address space. The use of emulators in this way can be considered the emulation path. The emulation path is inefficient compared to the enlightened IO path because it requires more CPU time to emulate devices than it does to pass messages between VSPs and VSCs. For example, several actions on memory mapped to registers are required in order to write a buffer to disk via the emulation path, while this may be reduced to a single message passed from a VSC to a VSP in the enlightened IO path.

Each child partition can include one or more virtual processors (230 and 232) that guest operating systems (220 and 222) can manage and schedule threads to execute thereon. Generally, the virtual processors are executable instructions and associated state information that provide a representation of a physical processor with a specific architecture. For example, one virtual machine may have a virtual processor having characteristics of an Intel x86 processor, whereas another virtual processor may have the characteristics of a PowerPC processor. The virtual processors in this example can be mapped to processors of the computer system such that the instructions that effectuate the virtual processors will be directly executed by physical processors. Thus, in an embodiment including multiple processors, virtual processors can be simultaneously executed by processors while, for example, other processor execute hypervisor instructions. The combination of virtual processors and memory in a partition can be considered a virtual machine.

Guest operating systems (220 and 222) can be any operating system such as, for example, operating systems from Microsoft®, Apple®, the open source community, etc. The guest operating systems can include user/kernel modes of operation and can have kernels that can include schedulers, memory managers, etc. Generally speaking, kernel mode can include an execution mode in a processor that grants access to at least privileged processor instructions. Each guest operating system can have associated file systems that can have applications stored thereon such as terminal servers, e-commerce servers, email servers, etc., and the guest operating systems themselves. The guest operating systems can schedule threads to execute on the virtual processors and instances of such applications can be effectuated.

Figure 3:
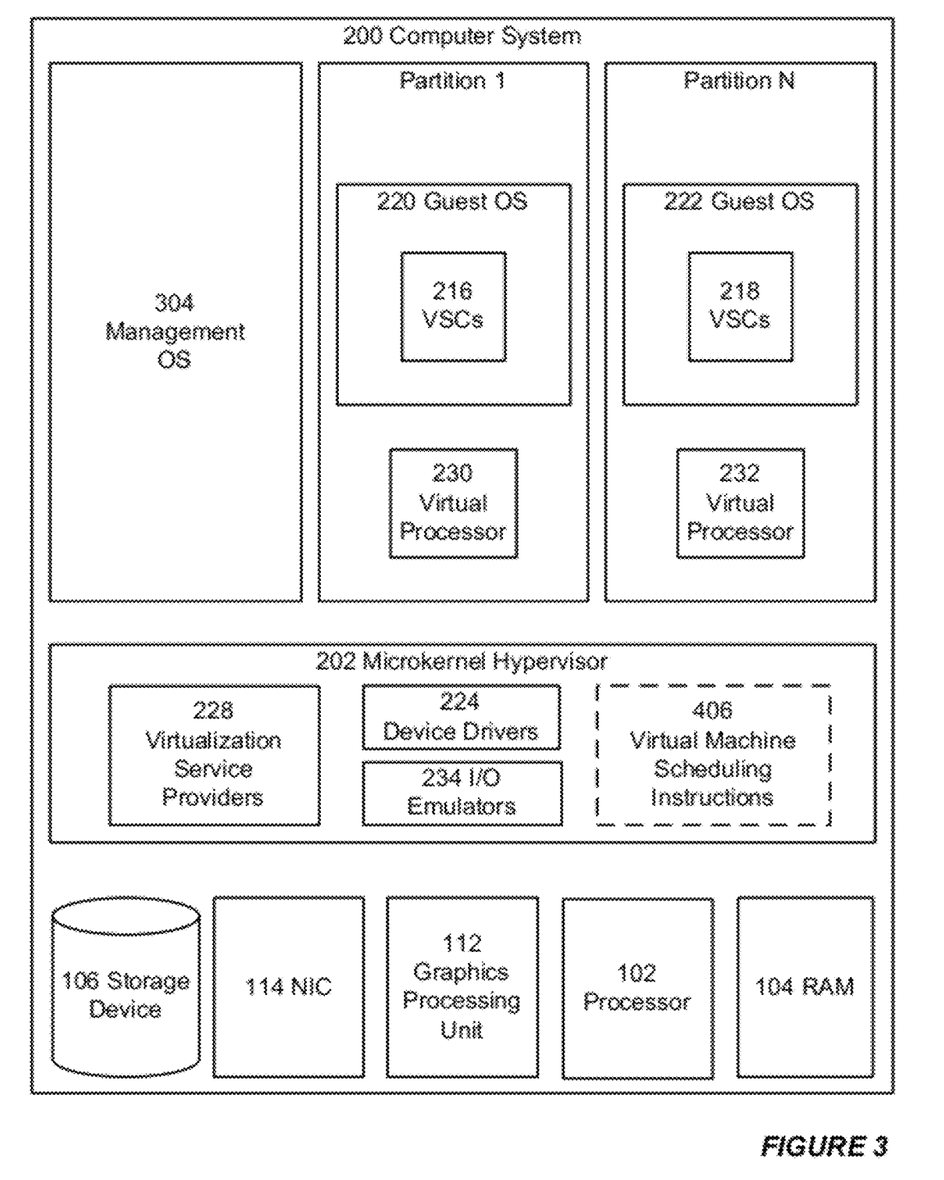
FIG. 3 depicts a block diagram of an alternative architecture for a virtualizing software program.

Referring now to FIG. 3, it illustrates an alternative virtualization platform to that described above in FIG. 2. FIG. 3 depicts similar components to those of FIG. 2; however, in this example embodiment hypervisor 302 can include a microkernel component and components similar to those in host environment 204 of FIG. 2 such as the virtualization service providers 228 and device drivers 224, while management operating system 304 may contain, for example, configuration utilities used to configure hypervisor 302. In this architecture, hypervisor 302 can perform the same or similar functions as microkernel hypervisor 202 of FIG. 2; however, in this architecture hypervisor 304 effectuates the enlightened IO path and includes the drivers for the physical hardware of the computer system. Hypervisor 302 of FIG. 3 can be a stand alone software product, a part of an operating system, embedded within firmware of the motherboard or a portion of hypervisor 302 can be effectuated by specialized integrated circuits.

Figure 4:
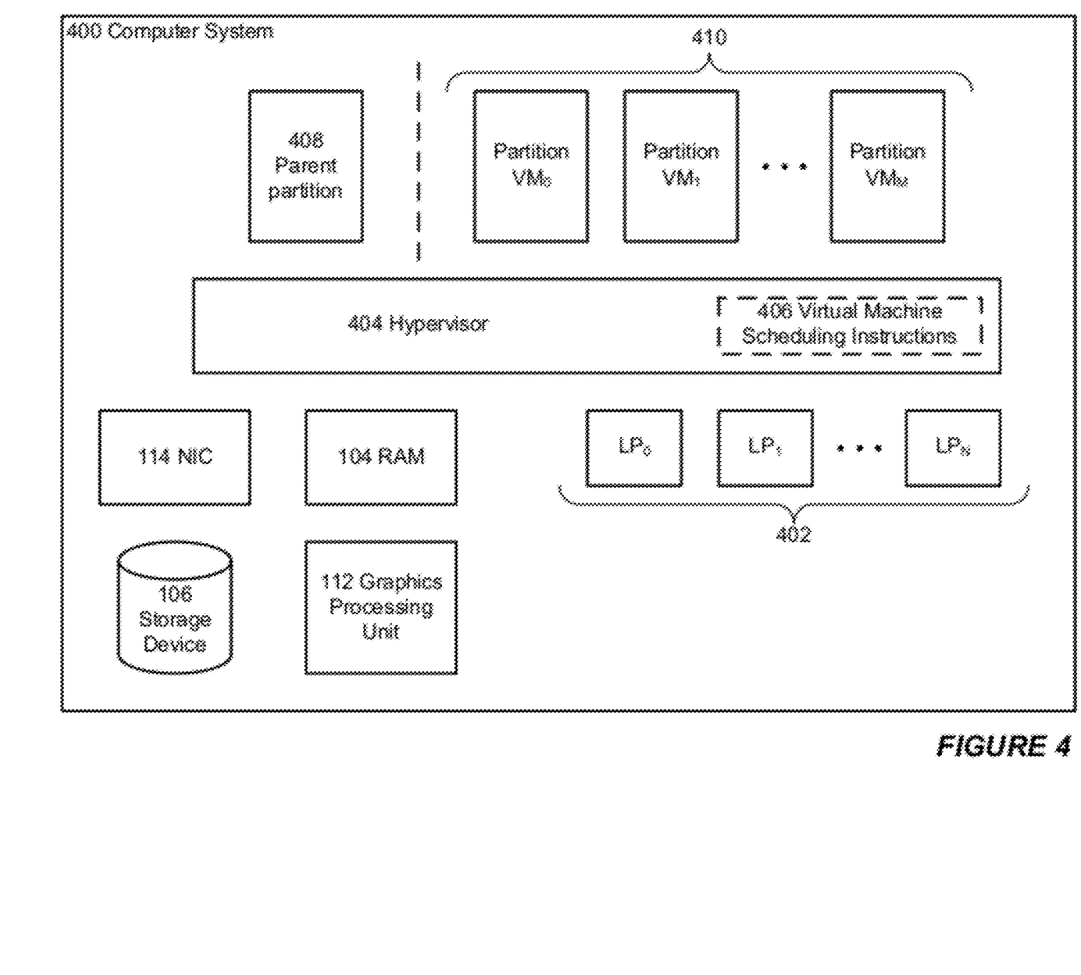
FIG. 4 depicts a computer system with multiple logical processors and an exemplary architecture for a virtualizing software program.

Referring now to FIG. 4, depicted is an embodiment of a computer system 400 with multiple logical processors 402. In this embodiment, hypervisor 404 is configured to control and arbitrate access to the logical processors 402 of computer system 400. More specifically, hypervisor 404 has access to virtual machine scheduling instructions 406 which include instructions on how hypervisor 404 controls and arbitrates access to the logical processors 402 of computer system 400. Computer system 400 also includes a parent partition 408 and multiple partitions 410. The example computer system 400 depicted in FIG. 4 includes M number of logical processors, labeled as $LP_0$, $LP_1$, . . . , $LP_M$, and N number of virtual machine partitions, labeled as $VM_0$, $VM_1$, . . . , $VM_N$. Hypervisor 404 is cable of individually monitoring the utilization percentages of each of partitions $VM_0$, $VM_1$, . . . , $VM_N$ and each of logical processors $LP_0$, $LP_1$, . . . , $LP_M$. The virtual machine scheduling instructions 406 include instructions on how hypervisor 404 controls the scheduling of each of the partitions $VM_0$, $VM_1$, . . . , $VM_N$ on the logical processors $LP_0$, $LP_1$, . . . , $LP_M$.

The performance of each logical processor 402 and the performance of the overall computing system 400 is affect by the way in which the virtual machine partitions 410 are scheduled on the logical processors 402. For example, if each of the partitions 410 is scheduled to operate on a different logical processor 402, then each partition 410 will have a dedicated logical processor capable of performing any processing requested by the partition. In addition, one of the logical processors 402 may be an ideal logical processor for a particular partition and scheduling a partition on its ideal logical processor can increase the efficiency of the processing for that partition. However, operating more logical processors 402 than necessary may also increase the energy consumption of the computing system 400.

Figure 5:
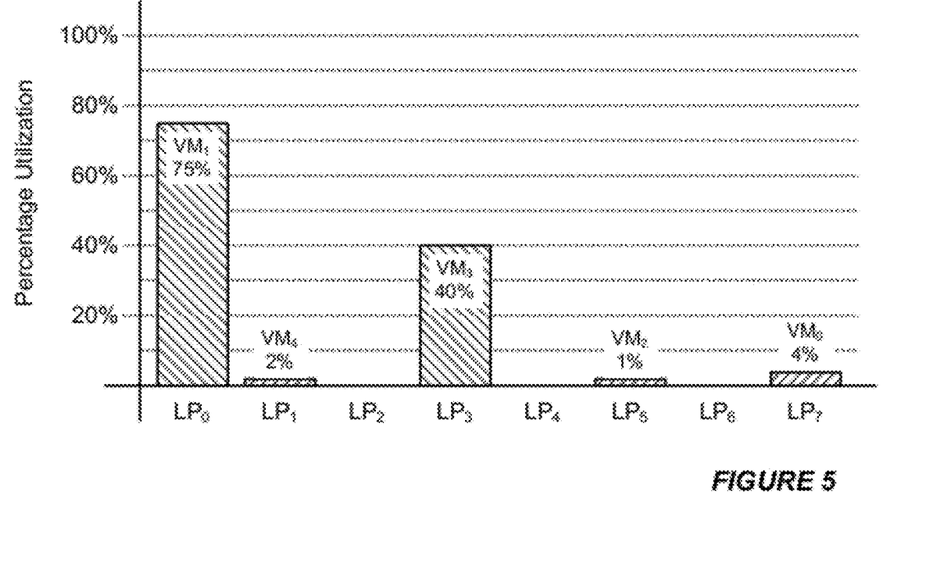
FIGS. 5-8 depict various instances of virtual machines scheduled on logical processors.

Referring now to FIG. 5, depicted are five partitions, $VM_0$-$VM_4$, which are each scheduled to operate on one of eight logical processors, $LP_0$-$LP_7$. As shown, the partitions are scheduled on logical processors as follows: $VM_0$ is operating at 4% utilization and is scheduled on $LP_7$; $VM_1$ is operating at 75% utilization and is scheduled on $LP_0$; $VM_2$ is operating at 1% utilization and is scheduled on $LP_5$; $VM_3$ is operating at 40% utilization and is scheduled on $LP_3$; and $VM_4$ is operating at 2% utilization and is scheduled on $LP_1$. In this depiction, each of partitions $VM_0$-$VM_4$ has a dedicated logical processor because no partition shares a logical processor with another partition. Also, each of the partitions $VM_0$-$VM_4$ may be on its ideal logical processor. Scheduling each partition on its ideal logical processor may provide for the most efficient processing of each of partitions $VM_0$-$VM_4$. However, this scheduling also requires that five logical processors, $LP_0$, $LP_1$, $LP_3$, $LP_5$, and $LP_7$, be powered, which may not be the most efficient level of power consumption for the computing system.

Figure 6:
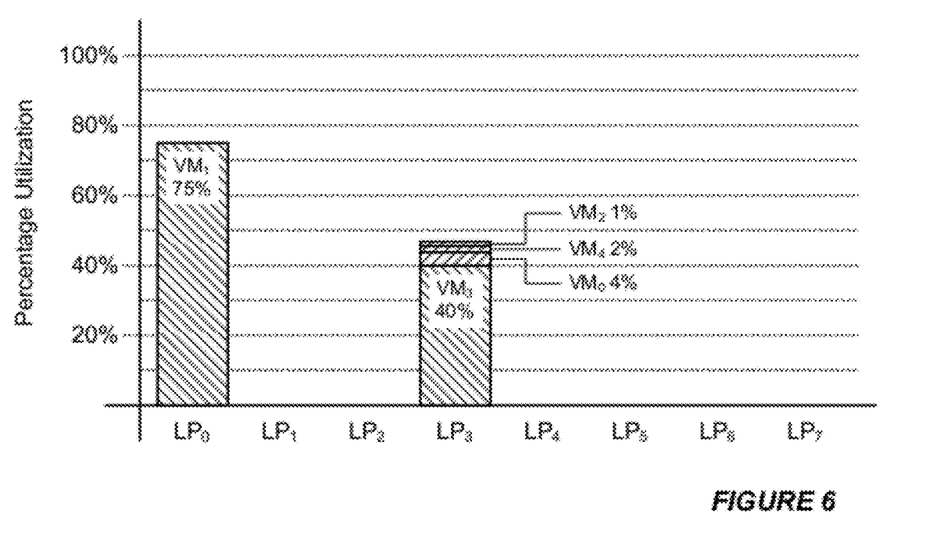

To reduce the number of powered logical processors, one solution is to schedule virtual machines such that the minimum number of logical processors are used, such as in the scheduling depicted in FIG. 6. The utilization requirements of each of the five partitions $VM_0$-$VM_4$ does not allow for all of the partitions to be hosted by a single processor. However, two logical processors can accommodate the needs of the five partitions $VM_0$-$VM_4$. As shown in FIG. 6, three partitions $VM_0$, $VM_2$, and $VM_4$, can be scheduled on logical processor $LP_3$ with partition $VM_3$. Thus, in the scheduling depicted in FIG. 6, only two processors are used: logical processor $LP_3$ hosts four partitions $VM_0$, $VM_2$, $VM_3$, and $VM_4$, and logical processor $LP_0$ hosts one partition $VM_1$. The other five logical processors can be powered down to reduce the amount of power consumption of the computing system.

Management of power consumption by using the minimum number of logical processors, as depicted in FIG. 6, does not require the power manager to know the individual utilization of each partition in the computing system 400. Instead, the power manger needs to know the combined utilization of all of the partitions 410. Because the power manager does not need to know the individual utilization of each partition, the power management can effectively be performed by parent partition 408.

Figure 7:
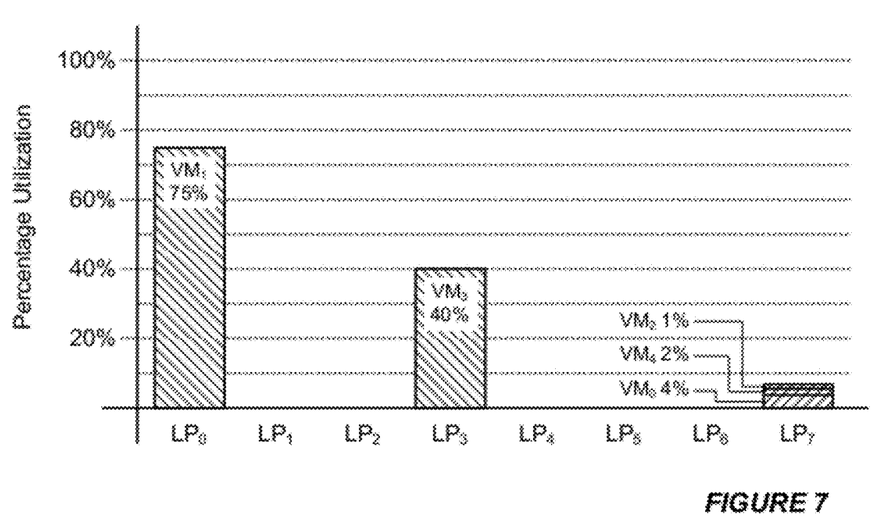

Referring now to FIG. 7, an embodiment of the scheduling by the present invention is depicted. In this embodiment, all of the idle partitions are scheduled on a processor that is idle instead of merely using the minimum number of logical processors. In this configuration, each of partitions $VM_0$, $VM_2$, and $VM_4$ is deemed to be idle and partitions $VM_1$ and $VM_3$ are deemed to be non-idle. As shown, each of the idle partitions $VM_0$, $VM_2$, and $VM_4$ is scheduled on logical processor $LP_7$, leaving partition $VM_1$ scheduled on logical processor $LP_0$ and partition $VM_3$ scheduled on logical processor $LP_3$. Logical processor $LP_3$ may be the ideal logical processor for $VM_3$. However, logical processor $LP_7$ may not be the ideal logical processor for any of $VM_0$, $VM_2$, and $VM_4$. By scheduling all of the idle partitions on a logical processor that is not hosting a non-idle partition, none of the idle partitions are scheduled on the same logical processor as a non-idle partition.

One of the benefits of scheduling in the manner depicted by FIG. 7 is that the process requests of the non-idle partitions are not hindered by the process requests of the idle partitions. In the configuration depicted in FIG. 6, logical processor $LP_3$ receives process requests from non-idle partition $VM_3$ and from idle partitions $VM_0$, $VM_2$, and $VM_4$. Logical processor $LP_3$ cannot determine whether the process requests from non-idle partition $VM_3$ have a higher priority than the process requests from idle partitions $VM_0$, $VM_2$, and $VM_4$. Thus, logical processor $LP_3$ may process low priority process requests from idle partitions $VM_0$, $VM_2$, and $VM_4$ while high priority process requests of non-idle partition $VM_3$ wait for logical processor $LP_3$ to process the low priority requests. Further, in some cases, the partition scheduler may recognize that the process requests of partition $VM_3$ are not being processed efficiently and temporarily schedule partition $VM_3$ on another logical processor, such as logical processor $LP_4$. However, this temporary scheduling of $VM_3$ on logical processor $LP_4$ can introduce a number of inefficiencies, such as the need to power up logical processor $LP_4$, the scheduling of partition $VM_3$ on a non-ideal logical processor, among others. The scheduling depicted in FIG. 7 avoids these inefficiencies because none of the non-idle partitions are scheduled on the same logical processor as an idle partition. As depicted in FIG. 7, none of the logical processors hosts both an idle partition and a non-idle partition. Thus, the process requests from idle partitions do not delay or otherwise impede the process requests of non-idle partitions and the non-idle partitions do not need to be temporarily scheduled on other logical processors.

The scheduling shown in FIG. 7 appears to have some drawbacks. For example, the scheduling in FIG. 7 uses three logical processors when all of the virtual machines could be hosted by only two logical processors. The use of logical processor $LP_7$ to host idle partitions $VM_0$, $VM_2$, and $VM_4$ requires logical processor $LP_7$ to be powered. However, because it is only hosting idle logical processors, logical processor $LP_7$ may be able to be set to a low or intermediate power state depending on the number of idle partitions and the utilization levels of the idle partitions. Another potential inefficiency is that, by scheduling each of the idle partitions on a single logical processor, it is likely that the some or all of the idle partitions are not scheduled on their ideal logical processor. However, since the utilization of the idle partitions is so low, the inefficiencies of operating an idle partition on a non-ideal logical processor are negligible. Furthermore, the efficiencies gained by scheduling all of the idle partitions on an idle logical processor can outweigh the inefficiencies of operating all of the idle partitions on a non-ideal logical processor.

In one embodiment, the operator of computing system 400 may contract to host another party's virtual machine. Such a contract may include a service level agreement which guarantees certain performance level for that party's virtual machine. Having the logical processor capabilities to meet that guaranteed performance level can be more important than consolidating the entire workload on few logical processors as possible. In the example depicted in FIG. 7, it may be advantageous to leave $VM_3$ with its 40% utilization alone on $LP_3$ so that $VM_3$ will have available to it all of the performance capabilities needed to meet a guaranteed performance level for $VM_3$. Since partitions $VM_0$, $VM_2$, and $VM_4$ are idle, it may be better to schedule them on another logical processor so that they do not perturb the performance of $VM_3$.

The hypervisor 404 can perform the scheduling depicted in FIG. 7. The hypervisor 404 can monitor the individual utilization of each partition in the computing system and the individual utilization of each logical processor in the computing system. Because of its abilities to monitor individual partitions and logical processors, the hypervisor can control the scheduling of the partitions on the logical processors. Thus, virtual machine scheduling instructions 406 can be included in hypervisor 404.

Figure 8:
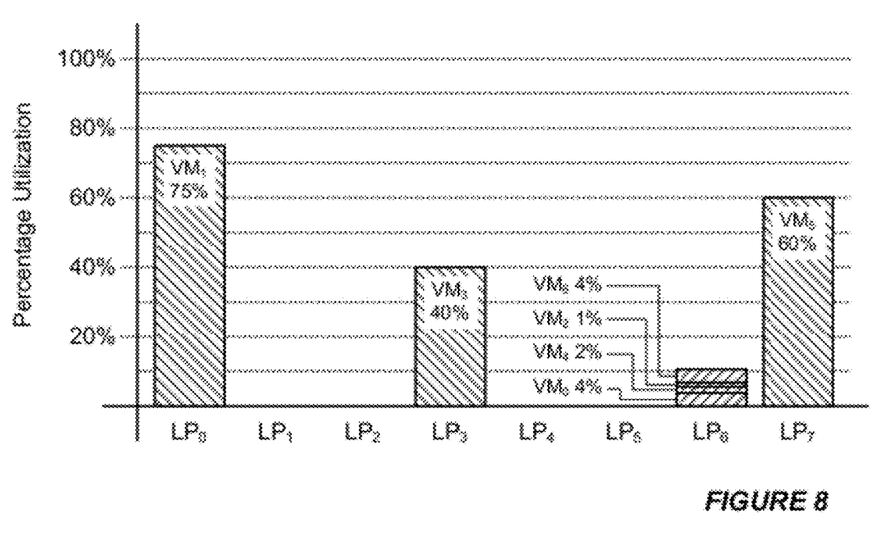

Referring now to FIG. 8, another embodiment of the scheduling by the present invention is depicted. In this embodiment, two partitions, non-idle partition $VM_5$ and idle partition $VM_6$ are added to the computing system. Non-idle partition $VM_5$ is scheduled on logical processor $LP_7$. One possible reason for the scheduling of partition $VM_5$ on logical processor $LP_7$ is that logical processor $LP_7$ may be the ideal logical processor for partition $VM_5$. Because a non-idle partition $VM_5$ is scheduled on logical processor $LP_7$, logical processor $LP_7$ is no longer an idle logical processor. Thus, in the depiction shown in FIG. 8, logical processors $LP_1$, $LP_2$, $LP_4$, $LP_5$, and $LP_6$ are the only idle logical processors and the idle partitions in the system, $VM_0$, $VM_2$, $VM_4$, and $VM_6$, are scheduled on idle logical processor $LP_6$.

Figure 9A:
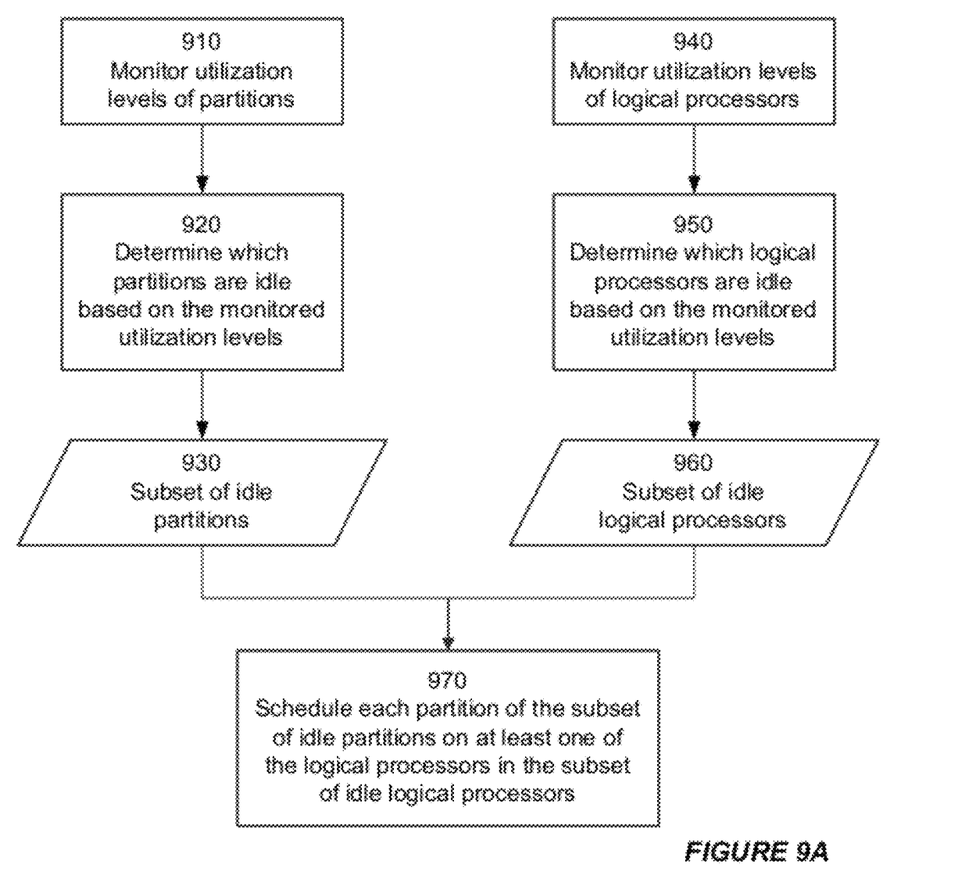
FIGS. 9A-9D depict various method of scheduling virtual machines on logical processors.

Referring now to FIG. 9A, an embodiment is depicted of the processing performed by the hypervisor based on virtual machine scheduling instructions 406. The hypervisor 404 monitors 910 the utilization levels of each of the partitions and determines 920 which of the partitions are idle based on the monitored utilization levels. The partitions which are determined to be idle make up a subset of idle partitions 930. The hypervisor 404 also monitors 940 the utilization levels of each of the logical processors and determines 950 which of the logical processors are idle based on the monitored utilization levels. The logical processors which are determined to be idle make up a subset of idle logical processors 960. The hypervisor then schedules 970 each of the idle partitions (i.e., each of the partitions in the subset of idle partitions 930) on at least one of the idle logical processors (i.e., on at least on of the logical processors in the subset of idle logical processors 960). The hypervisor can also schedule the non-idle partitions on one or more of the logical processors. This process can be repeated as frequently as desired so that the hypervisor dynamically schedules the partitions in the computing environment, responding to changes in the levels of utilization of partitions and logical processors.

Figure 9B:
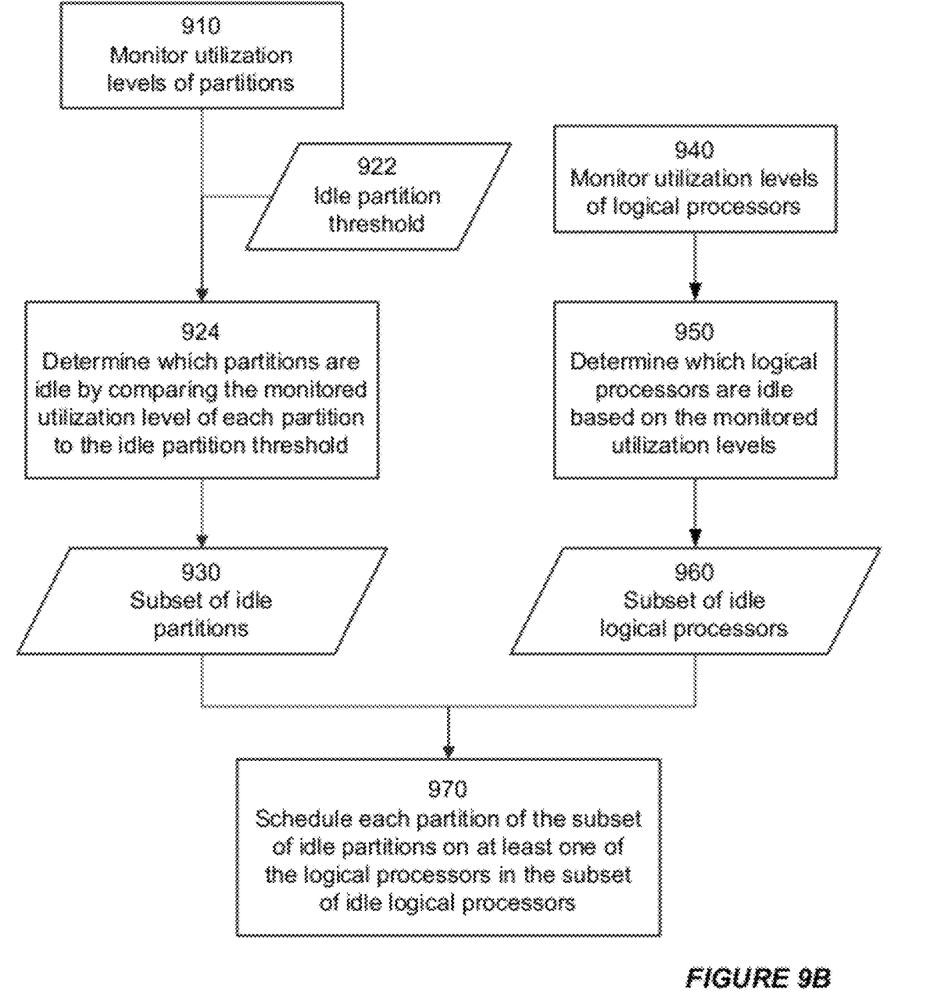

Referring now to FIG. 9B, an embodiment is depicted of how the hypervisor 404 determines which of the partitions are idle based on an idle partition threshold 922. The hypervisor monitors the 910 the utilization levels of each of the partitions. The hypervisor 404 determines 924 which of the partitions are idle by comparing the monitored utilization level of each partition to the idle partition threshold 922. The partitions which are determined to be idle make up a subset of idle partitions 930. For example, the idle partition threshold 922 may be 5% utilization and the hypervisor determines 924 that all partitions with a utilization level less than the idle partition threshold of 5% utilization are idle. The hypervisor 404 also monitors 940 the utilization levels of each of the logical processors and determines 950 which of the logical processors are idle. The hypervisor 404 schedules 970 each of the idle partitions on at least one of the idle logical processors.

The use of an idle partition threshold may be desirable because partitions have some level of processing requirements even when the partitions are not being actively used. The processing requirements of a partition that is not actively being used may include maintaining a system clock and the like. The use of an idle partition threshold allows for partitions of a certain utilization level to be deemed to be idle even thought they have some processing requirements and are not completely inactive. The idle partition threshold 922 may be set to any desired threshold. Certain factors may be used to determine the idle partition threshold 922, such as the typical utilization level of a partition that is not being actively used, the efficiency of the computing system, the power consumption of the computing system, and others.

Figure 9C:
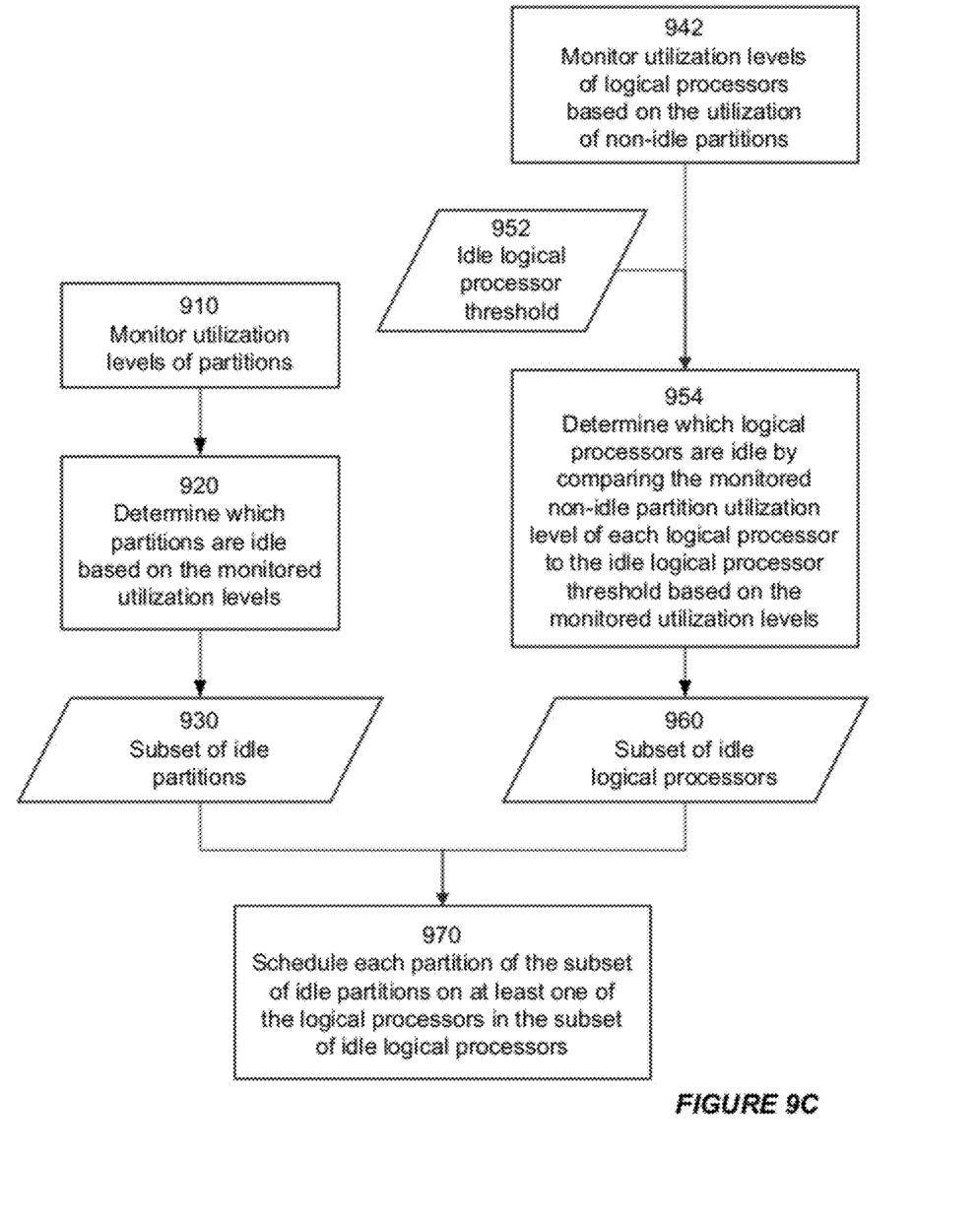

Referring now to FIG. 9C, an embodiment is depicted of how the hypervisor 404 determines which of the logical processors are idle based on an idle logical processor threshold 952. The hypervisor 404 monitors 910 the utilization levels of each of the partitions and determines 920 which of the partitions are idle. The partitions which are determined to be idle make up a subset of idle partitions 930. The hypervisor monitors 942 the utilization levels of each of the logical processors based on the utilization of non-idle partitions. For example, looking at FIG. 7, the utilization level of logical processor $LP_0$ based on non-idle partitions is 75% because the utilization of non-idle partition $VM_1$ is 75%. However, the utilization level of logical processor $LP_7$ based on non-idle partitions is 0% because the only partitions scheduled on logical processor $LP_7$ are idle partitions $VM_0$, $VM_2$, and $VM_4$.

After determining 942 the utilization levels of each of the logical processors based on the utilization of non-idle partitions, the hypervisor 404 determines 954 which of the logical processors are idle by comparing the monitored non-idle partition utilization level of the each logical processor to the idle logical processor threshold 952. For example, in the case where the idle logical processor threshold is 3%, each of the logical processors with a non-idle partition utilization level less than 3% is deemed to be idle. Looking again at the example in FIG. 7, with a 3% idle logical processor threshold, logical processors $LP_1$, $LP_2$, $LP_4$, $LP_5$, $LP_6$, and $LP_7$, are all idle because they have a non-idle partition utilization level less than 3%. Of note is logical processor $LP_7$ which has a combined utilization of 7% because it is hosting idle partitions $VM_0$, $VM_2$, and $VM_4$ with utilization levels of 4%, 1%, and 2%, respectively. However, even though logical processor $LP_7$ has a combined utilization of 7%, which is over the 3% idle logical processor threshold, it is still deemed to be idle because its utilization level based on non-idle partitions is 0%.

The logical processors which are determined to be idle make up a subset of idle logical processors 960. The hypervisor 404 then schedules 970 each of the idle partitions (i.e., each of the partitions in the subset of idle partitions 930) on at least one of the idle logical processors (i.e., at least one of the logical processors in the subset of idle logical processors 960). In the example from FIG. 7, logical processor $LP_7$ would be in the subset of idle logical processors 960 and the hypervisor 404 could schedule idle partitions on any of the idle partitions, including logical processor $LP_7$. This is important because, in one embodiment of the present invention, all of the idle partitions are scheduled on one idle logical processor. In order for all of the idle partitions to be scheduled on one idle logical processor, that processor must be considered to be idle even when the utilization of the logical processor based on idle partitions is over the idle logical processor threshold.

Figure 9D:
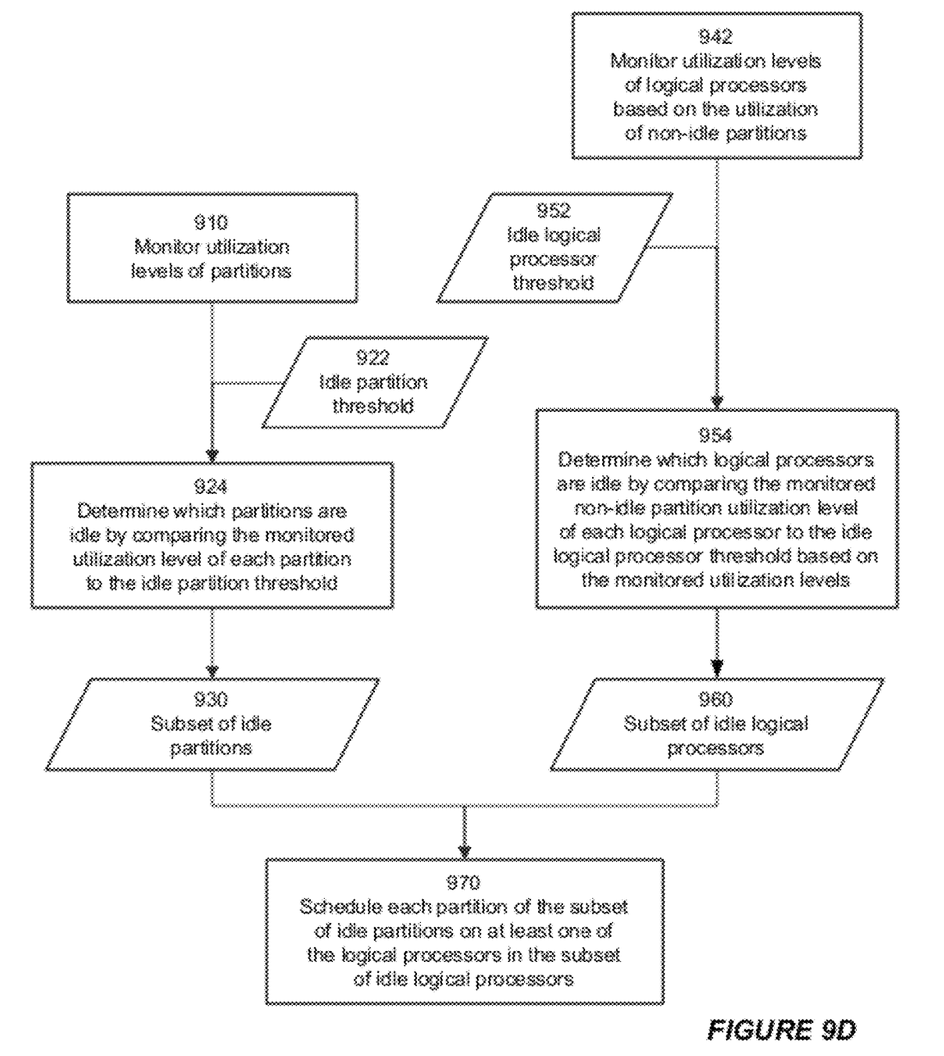

Referring now to FIG. 9D, an embodiment is depicted of the method performed by the hypervisor using both the idle partition threshold 922 and the idle logical processor threshold 952. The hypervisor monitors the 910 the utilization levels of each of the partitions. The hypervisor 404 determines 924 which of the partitions are idle by comparing the monitored utilization level of each partition to the idle partition threshold 922. The partitions which are determined to be idle make up a subset of idle partitions 930. The hypervisor 404 also monitors 940 the utilization levels of each of the logical processors and determines 950 which of the logical processors are idle. The hypervisor 404 monitors 942 the utilization levels of each of the logical processors based on the utilization of non-idle partitions. The hypervisor 404 determines 954 which of the logical processors are idle by comparing the monitored non-idle partition utilization level of the each logical processor to the idle logical processor threshold 952. The logical processors which are determined to be idle make up a subset of idle logical processors 960. The hypervisor 404 then schedules 970 each of the idle partitions (i.e., each of the partitions in the subset of idle partitions 930) on at least one of the idle logical processors (i.e., on at least one of the logical processors in the subset of idle logical processors 960).

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

What is claimed:

1. A method for use by a hypervisor operating in a computer system which comprises a plurality of partitions operating on a plurality of logical processors, the method comprising:
   monitoring utilization levels of the plurality of partitions;
   determining that a subset of the plurality of partitions are idle based on the utilization level of the subset of the plurality of partitions being below a threshold;
   monitoring utilization levels of the plurality of logical processors;
   determining that a subset of logical processors of the plurality of the logical processors are idle based on the monitored utilization level of the subset of the plurality of logical processors being below an idle logical processor threshold percentage;
   scheduling partitions of the subset of idle partitions on at least one of the logical processors in the subset of idle logical processors.

2. The method of claim 1, wherein the monitored utilization levels of the plurality of logical processors comprise a utilization level based on the utilization of non-idle partitions, and wherein determining that the subset of logical processors are idle comprises comparing the monitored utilization level of each of the plurality of logical processors based on the utilization of non-idle partitions to an idle logical processor threshold.

3. The method of claim 2, wherein the idle logical processor threshold is a predetermined logical processor utilization percentage.

4. The method of claim 2, wherein determining that the subset of the plurality of partitions are idle comprises comparing the monitored utilization level of each of the plurality of partitions to an idle partition threshold.

5. The method of claim 1, wherein determining that the subset of the plurality of partitions is idle comprises comparing the monitored utilization level of each of the plurality of partitions to an idle partition threshold.

6. The method of claim 5, wherein the idle partition threshold is a predetermined partition utilization percentage.

7. The method of claim 6, wherein each of the plurality of partitions which is not idle is scheduled on a different one of the plurality of logical processors.

8. The method of claim 1, further comprising:
   changing a power state of at least one of the plurality of logical processors based on the scheduling of each of the determined at least one idle partition.

9. The method of claim 1, wherein any partition of the plurality of partitions determined to be idle is scheduled onto one or more logical processors determined to be idle.

10. The method of claim 9, wherein any partition of the plurality of partitions that is not determined to be idle is scheduled onto the one or more logical processors determined to be idle.

11. A computing system, comprising:
   at least one physical processor;
   a plurality of partitions operating in the computing system;
   a plurality of logical processors capable of hosting one or more of the plurality of partitions, each of the plurality of logical processors operating on the at least one physical processor; and
   a hypervisor, wherein the hypervisor is configured to:
      monitor utilization levels of the plurality of partitions and utilization levels of the plurality of logical processors operating on the at least one physical processor,
      determine that a subset of the plurality of partitions are idle based on the monitored utilization levels of the subset of the plurality of partitions being below a threshold,
      determine that a subset of logical processors of the plurality of logical processors are idle based on the monitored utilization levels of the subset of the plurality of logical processors being below an idle logical processor threshold percentage,
      schedule partitions of the subset of idle partitions on at least one of the logical processors in the subset of idle logical processors.

12. The computing system of claim 11, wherein the hypervisor is configured to monitor the utilization levels of the plurality of logical processors by monitoring a utilization level of each of the plurality of logical processors based on the utilization of non-idle partitions, and wherein the hypervisor is configured to determine that the subset of logical processors are idle by comparing the monitored utilization level of each of the plurality of logical processors based on the utilization of non-idle partitions to an idle logical processor threshold.

13. The computing system of claim 12, wherein the idle logical processor threshold is a predetermined logical processor utilization percentage.

14. The computing system of claim 12, wherein the hypervisor is configured to determine that at least one partition of the plurality of partitions is idle by comparing the monitored utilization level of each of the plurality of partitions to an idle partition threshold.

15. The computing system of claim 11, wherein the hypervisor is configured to determine that at least one partition of the plurality of partitions is idle by comparing the monitored utilization level of each of the plurality of partitions to an idle partition threshold.

16. The computing system of claim 15, wherein the idle partition threshold is a predetermined partition utilization percentage.

17. A computer readable storage device excluding signals per se tangibly embodying computer readable instructions of a hypervisor for execution in a computing environment comprising a plurality of logical processors and a plurality of partitions, the instructions comprising:
   instructions to monitor utilization levels of the plurality of partitions;
   instructions to monitor utilization levels of the plurality of logical processors;
   instructions to determine that a subset of the plurality of partitions are idle based on the utilization levels of the subset of the plurality of partitions being below a threshold;
   instructions to determine that a subset of logical processors of the plurality of logical processors are idle based on the monitored utilization levels of the subset of the plurality of logical processors being below an idle logical processor threshold percentage;

instructions to schedule partitions of the subset of idle partitions on at least one of the logical processors in the subset of idle logical processors.

18. The computer readable storage device excluding signals per se of claim 17, wherein the instructions to monitor utilization levels of the plurality of logical processors comprise instructions to monitor a utilization level of each of the plurality of logical processors based on the utilization of non-idle partitions, and wherein the instructions to determine that a subset of the plurality of logical processors are idle comprise instructions to compare the monitored utilization level of each of the plurality of logical processors based on the utilization of non-idle partitions to an idle logical processor threshold.

19. The computer readable storage device excluding signals per se of claim 17, wherein instructions to determine that a subset of the plurality of partitions are idle comprise instructions to compare the monitored utilization level of each of the plurality of partitions to an idle partition threshold.

* * * * *

UNITED STATES PATENT AND TRADEMARK OFFICE
CERTIFICATE OF CORRECTION

PATENT NO. : 9,804,874 B2  
APPLICATION NO. : 13/090633  
DATED : October 31, 2017  
INVENTOR(S) : Thomas Fahrig Page 1 of 1

It is certified that error appears in the above-identified patent and that said Letters Patent is hereby corrected as shown below:

In the Claims

Claim 1, Column 11, Line 29: After the word "percentage;" insert the word --and--.

Claim 11, Column 12, Line 2: After the word "percentage," insert the word --and--.

Claim 17, Column 12, Line 69: After the word "percentage," insert the word --and--.

Signed and Sealed this  
Sixth Day of November, 2018

Andrei Iancu  
*Director of the United States Patent and Trademark Office*